United States Patent [19]
Murakami et al.

[11] Patent Number: 5,273,193
[45] Date of Patent: Dec. 28, 1993

[54] WELDED FUEL TANK HAVING A MAGNET FOR COLLECTING WELD SPATTER AND METHOD FOR COLLECTING WELD SPATTER

[75] Inventors: Sadatoshi Murakami; Satoru Yamasaki; Tatsumi Harada, all of Fukuyama, Japan

[73] Assignee: Mitsubishi Denki Kabushiki Kaisha, Tokyo, Japan

[21] Appl. No.: 318,641

[22] Filed: Mar. 3, 1989

[30] Foreign Application Priority Data

| Mar. 9, 1988 | [JP] | Japan | 63-56828 |
| Mar. 9, 1988 | [JP] | Japan | 63-56829 |
| Mar. 9, 1988 | [JP] | Japan | 63-56830 |

[51] Int. Cl.⁵ .............................. B67D 5/58
[52] U.S. Cl. ..................... 222/189; 222/385; 222/377; 228/214; 209/215; 210/172; 210/222; 210/695
[58] Field of Search ............... 210/172, 222, 695, 223; 222/189, 385, 377; 220/1 B, 85 S, 85 R, 562; 206/818; 29/48, 81.01, 81.03, 81.02, 81.17; 228/184, 201, 214; 209/215

[56] References Cited

U.S. PATENT DOCUMENTS

| 1,103,358 | 7/1914 | Hess | 209/215 |
|---|---|---|---|
| 1,673,837 | 6/1928 | Lotz | 210/222 |
| 2,345,029 | 3/1944 | Brooks | 210/222 X |
| 2,352,958 | 7/1944 | Lauer et al. | 222/385 X |
| 2,358,612 | 9/1944 | Acker | 210/222 |
| 2,436,740 | 2/1948 | Brooks | 210/222 |
| 2,690,842 | 10/1954 | Spluvak | 210/222 X |
| 2,704,156 | 3/1955 | Botstiber | 210/222 |
| 2,755,932 | 7/1956 | Cohn | 210/222 |
| 2,771,995 | 11/1956 | Noel | 210/222 |
| 2,877,899 | 3/1959 | Hutchins et al. | 210/222 |
| 2,915,185 | 12/1959 | Waldherr, Jr. | 210/222 |
| 2,936,890 | 5/1960 | Botstiber | 210/222 X |
| 2,964,190 | 12/1960 | Smith | 210/222 |
| 3,061,104 | 10/1962 | Schaffner | 210/222 X |
| 3,139,403 | 6/1964 | Cramer et al. | 210/222 |
| 3,170,871 | 2/1965 | Moriya | 210/222 |
| 3,171,806 | 3/1965 | Schaffner | 210/223 X |
| 3,240,341 | 3/1966 | Rosaen | 210/222 |
| 3,306,454 | 2/1967 | Webb | 210/172 |
| 3,373,352 | 3/1968 | Huigens | 210/222 X |
| 4,053,409 | 10/1977 | Kuhfuss | 210/172 X |
| 4,371,437 | 2/1983 | Iwasaki et al. | 210/172 X |
| 4,529,517 | 7/1985 | Bertil | 210/223 |
| 4,551,602 | 11/1985 | Inoue et al. | 210/223 X |
| 4,561,977 | 12/1985 | Sasaki | 210/356 |

FOREIGN PATENT DOCUMENTS

| 601179 | 7/1960 | Canada | 210/222 |
| 548853 | 4/1932 | Fed. Rep. of Germany | 209/215 |
| 160876 | 10/1984 | Japan . | |
| 4756 | 1/1985 | Japan . | |
| 1146512 | 10/1966 | United Kingdom | 222/377 |

Primary Examiner—Robert P. Olszewski
Assistant Examiner—Boris Milef
Attorney, Agent, or Firm—Leydig, Voit & Mayer

[57] ABSTRACT

A welding fuel tank has a magnet 3 disposed on the inside or outside thereof in the vicinity of a fuel pump 12 which is housed inside the fuel tank. The magnet collects magnetic spatter which remains inside the fuel tank after welding and prevents the spatter from entering the fuel pump. The magnet may be a permanent magnet or an electromagnet, and it may be disposed outside the pump or in the fuel filter of the fuel pump. A cleaning method for a welded fuel tank comprises introducing a magnet into a fuel tank after welding, vibrating the fuel tank so that the magnet will move about the inside of the fuel tank and collect magnetic spatter, and then removing the magnet and spatter from the fuel tank.

15 Claims, 4 Drawing Sheets

WELDED FUEL TANK HAVING A MAGNET FOR COLLECTING WELD SPATTER AND METHOD FOR COLLECTING WELD SPATTER

This invention relates to the manufacture of welded containers. It has particular reference to the manufacture of welded tanks to be used in conjunction with electric discharge pumps. More particularly but not exclusively, it relates to the manufacture of welded fuel tanks of the type having a fuel pump housed therein, suitable for use in automotive vehicles.

Commonly, the fuel tank of an automobile is a welded body comprising upper and lower sections made of steel and joined to one another by seam welding. In the process of seam welding, small particles of metal, referred to as spatter, are formed and remain within the fuel tank, either scattered as loose particles, or trapped in the welded joint.

In many automobiles, a fuel pump and an electric pump motor are housed inside the fuel tank. In other vehicles the fuel pump and motor are housed outside the tank, more or less close to it. In operation, any steel spatter which remains inside the fuel tank after manufacture, can easily be drawn into the fuel pump with the fuel. Some of this spatter will reach the commutator region of the pump motor, and enter between the commutator and the motor brushes (vehicle fuel pump motors are normally DC commutator motors). As a result, the spatter increases wear of the commutator and brushes and shortens the life span of the motor. It may also enter pump or motor bearings and damage these.

It is therefore customary to clean the inside of a fuel tank after welding, to remove as much of the spatter as possible, but because the spatter is extremely small, ranging from 1 to several hundred micrometers in diameter, it is impossible to remove all of the spatter by conventional cleaning methods. Furthermore, this conventional cleaning is unable to remove spatter lodged in minute gaps in the welded joint. When the fuel tank is mounted in a vehicle and filled with fuel, vibrations and shocks which are produced when the automobile moves dislodge some of the spatter from the welded joint, and this dislodged spatter is drawn into the fuel pump with the fuel.

Although fuel pumps commonly have filters at their suction ports, such filters are generally designed to pass particles having a diameter of one hundred micrometers or less. Much of the spatter has a particle diameter smaller than this, and therefore can pass through the filter and enter the fuel pump. To stop entry of the spatter by making the filter finer, would increase the load on the pump and alter the fuel flow characteristics, so there is a practical limit to the extent to which a filter can be used to trap the spatter. It is an object of the present invention to provide a means and method for removing or trapping spatter in a welded container, and in particular, for preventing spatter from entering a fuel pump or other pump.

Fuel tanks and other containers are commonly made of steel and consequently the spatter consists of small magnetic particles.

In accordance with the present invention we propose to trap the spatter magnetically, the trapped spatter being then removed from the container, or else magnetically fixed within the container so that it cannot enter a discharge pump disposed in or connected to the container.

In one aspect, the present invention resides in a container for a liquid incorporating at least one seam weld, and at least one magnet associated with the container for magnetically collecting magnetic particles remaining in the container after formation of the seam weld(s).

The said magnet or magnets can be permanent or electromagnets, and can be disposed either on the outside of or inside the container.

In the case of a container with an internal discharge pump, the magnet or magnets should be disposed in the vicinity of the suction port of the pump so as to trap spatter before it can enter the pump.

In one preferred arrangement, a magnet is disposed inside an inlet filter of the discharge pump.

If the magnet or magnets are disposed on the outside of the container, there is no restriction on the materials constituting the magnets. If a magnet is to be disposed inside the container, it must be made of a material resistant to the liquid for which the container is intended, that is to say, petrol or diesel oil in the case of a fuel tank.

The magnet or magnets can be of any shape. They can be stationary or movable, permanently in position or removable.

In one preferred arrangement, at least one magnet, shaped so that it can roll, is placed inside the container so that it can roll on the bottom surface of the interior of the container when the container is tilted or vibrated before or during use, therefore increasing the amount of spatter which the magnet can collect.

In the case of a magnet applied to the exterior of the container, it will normally be necessary to leave the magnet permanently in place and operational, so as to hold the spatter immobile on the internal surface of the container adjacent the external magnet.

In the case of a magnet placed inside the container, it may be left in the container during use, to collect and trap spatter particles during use as well as before use, or it may be used to collect spatter before the container is used, being removed from the container before the container is put into use.

In another aspect, the present invention resides in a method of making a container of magnetic material for a liquid, comprising seam welding portions of the container, and applying at least one magnet to the container thereby magnetically trapping magnetic particles remaining in the container after seam welding.

The present invention further resides in a method of cleaning a welded fuel tank having a plurality of fuel tank sections which are joined together by seam welding, comprising: introducing a magnet into the inside of said fuel tank after said welding has been performed; applying external force to said fuel tank so as to dislodge magnetic particles which were formed during said seam welding and which are trapped in the seam-welded portions of said fuel tank, and so as to make said magnet move around the inside of said fuel tank and contact said magnetic particles, whereby said magnet catches said magnetic particles; and removing said magnet from said fuel tank.

Preferably the magnet has a shape such that it can roll about the inside of the fuel tank. In a preferred embodiment, a plurality of such magnets are enclosed in a bag within the fuel tank, during the cleaning operation, the bag making it easier to introduce the magnets into the fuel tank and remove them from it after cleaning.

The present invention will be further described with reference to the accompanying drawings, in which.

In the drawings, the same reference numerals indicate the same or corresponding parts.

Figure 1:
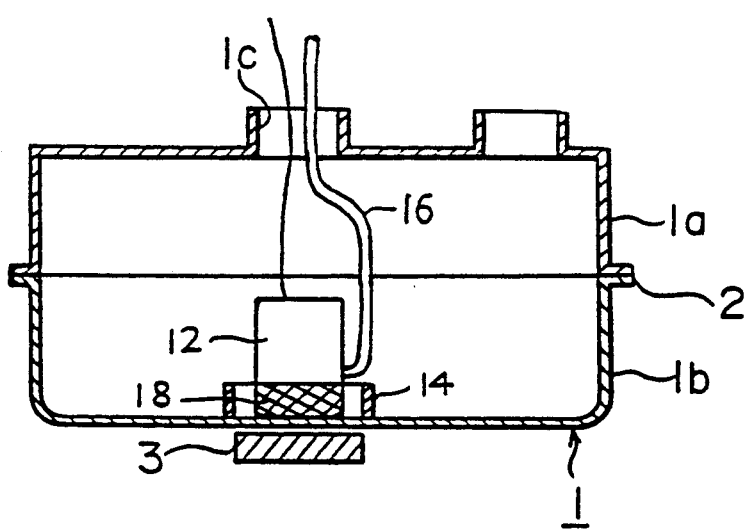
FIG. 1 is a schematic cross-sectional view of a first embodiment of a fuel tank in accordance with the present invention.

Hereinbelow, a number of preferred embodiments of a fuel tank in accordance with the present invention will be described while referring to the accompanying drawings. FIG. 1 of which illustrates a first embodiment. As shown in this Figure, a welded fuel tank 1 for an automobile comprises an upper fuel tank section 1a and a lower fuel tank section 1b which are joined together by seam welding along confronting flanges to form a welded joint 2. A fuel pump 12 is inserted into the fuel tank 1 through an installation hole 1c formed in the upper fuel tank section 1a. A permanent magnet 3 is secured to the outside of the bottom of the fuel tank 1 in the vicinity of the suction port of the fuel pump. The permanent magnet 3 constitutes magnet means for collecting magnetic particles (weld spatter) which remain within the fuel tank 1 after its manufacture.

The permanent magnet 3 can be secured to the underside of the fuel tank 1 by any means which will enable it to withstand the vibrations and accelerations to which it is subjected during operation of the automobile in which the fuel tank 1 is installed. If the fuel tank 1 is made of a magnetic material, the magnet 3 can be attached to the fuel tank 1 by the magnetic attraction of the magnet 3 for the fuel tank 1. Alternatively, it can be bonded or clamped to the fuel tank 1. As is normal, the fuel pump 12 is placed within a well 14 to prevent the pump from running dry if the tank is tilted when only a small amount of fuel remains in it, and a fuel discharge pipe 16 extends from the pump to the exterior of the tank. The fuel pump has a suction port in its lower end, protected by a filter cap 18, for example as illustrated in EP-A-0191362. The magnet 3 is mounted directly below the pump, therefore close to the suction port of the pump.

The illustrated fuel tank 1 is installed in an automobile and is filled with fuel. At this time, spatter which was produced at the time of welding still remains in small gaps within the welded joint 2. When the automobile moves, the fuel tank 1 is subjected to vibrations, shocks, and accelerations which dislodge some of the spatter within the gaps in the joint 2, and the dislodged spatter enters the fuel within the fuel tank 1. Because the spatter has a higher density than the fuel, the spatter sinks to the bottom of the fuel tank 1. The vibrations of the fuel tank 1 cause the spatter to move about the bottom of the fuel tank 1, and any of the spatter which comes in the vicinity of the magnet 3 will be attracted by the magnet 3, held firmly against the bottom surface of the fuel tank 1 by magnetic attraction, and prevented from further movement. Since the magnet 3 is disposed in the vicinity of the suction port of the fuel pump, spatter is trapped by the magnet, mainly within the well 14, and thereby prevented from entering the fuel pump. Therefore, wear of the commutator and brushes of the fuel pump motor due to spatter entering therebetween can be eliminated, and the reliability and life span of the fuel pump can be greatly increased. Furthermore, the cost of installing a magnet 3 on the bottom of the fuel tank 1 is less than the cost of trying to completely remove the spatter from the fuel tank 1 during its manufacture by cleaning out the fuel tank 1.

Figure 2:
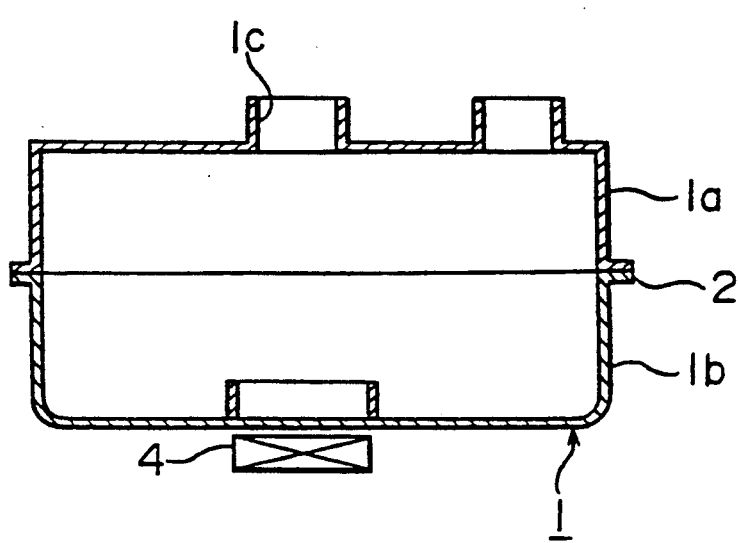
FIG. 2 is a schematic cross-sectional view of a second embodiment of the present invention which employs an electromagnet.

FIG. 2 illustrates a second embodiment of the present invention which differs from the first embodiment in that the magnet means is in the form of an electromagnet 4 comprising a coil of wire which is secured to the outside of a fuel tank 1 in the same position as the permanent magnet 3 of FIG. 1. So that the electromagnet 4 will be able to withstand vibrations and forces acting on it when the automobile is moving, it is secured to the bottom of the fuel tank by a mechanical fastener such as a strap which encircles the electromagnet 4, although other securing means can also be used. The operation and advantages of this embodiment are identical to those of the previous embodiment.

When an electromagnet is used, it will become deenergized when the vehicle ignition is switched off and therefore will provide only intermittent immobilisation of the spatter. This does not impair its effectiveness in protecting the pump, because when the magnet is deenergized, the pump is naturally also inoperative.

Figure 3:
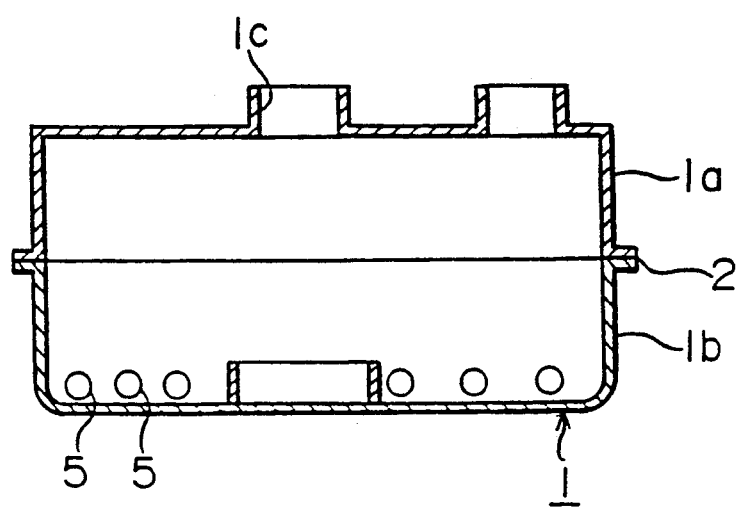
FIG. 3 is a schematic cross-sectional view of a third embodiment of the present invention which employs spherical magnets.
Figure 4:
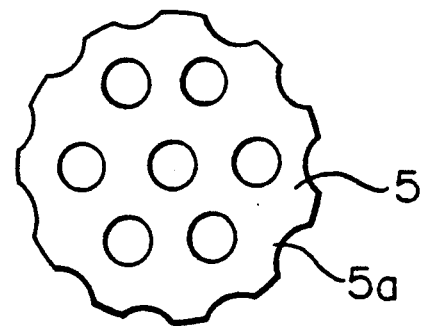
FIG. 4 is an enlarged view of one of the spherical magnets of FIG. 3.

FIG. 3 illustrates a third embodiment of the present invention in which the magnet means is in the form of a plurality of spherical magnets 5 which rest on the bottom surface of the inside of the fuel tank 1. Because the magnets 5 are round, they can roll about the inside of the fuel tank 1 when the fuel tank 1 is subjected to vibrations or accelerations or when it is tilted. As they roll about the fuel tank 1, the magnets 5 catch spatter and prevent the spatter from entering the fuel pump. The structure and operation of this embodiment is otherwise identical to that of the previous embodiment. The larger the surface area of the spherical magnets 5, the greater their ability to catch spatter and other magnetic particles. Therefore, the effectiveness of the spherical magnets 5 can be increased by forming surface irregularities therein. FIG. 4 is an enlarged view of one of the magnets 5 of FIG. 3 which has dimples 5a formed on its surface for the purpose of increasing the surface area.

Since these spherical magnets are immersed in the contents of the tank, they must be made of a material resistant to the tank contents. Metal magnets in general cannot be used, first because of the risk of corrosion of the magnets, second because magnets made of metal will normally have a small number of distinct poles, consequently regions of high field and regions of low field which will not attract and trap spatter particles.

Magnets to be placed inside the tank should therefore be made of resistant non-corrodible material such as ferrite or ceramic magnet materials, and furthermore should be such as to have an essentially uniform surface distribution of the magnetic field, so that they will be able to attract spatter substantially uniformly over their entire surface. Magnet materials comprising magnet particles dispersed in a matrix, for example of a suitable resistent plastics or rubber composition, can be used. In the case of loose spherical magnets such as shown in FIG. 3, the magnets must be discouraged from sticking to each other. Accordingly, they will in general have a relatively low but uniform surface field, sufficiently weak for attraction between the individual magnets to be broken by shaking or vibration of the fuel tank.

It is to be understood that the interior of the fuel tank will normally be cleaned, at least roughly, before the application of magnets to trap residual spatter. The amount of spatter which has to be trapped by the magnets is therefore relatively small, typically about one gram in a sixty liter tank, mostly trapped in the weld seam. This amount of spatter can be successfully trapped by magnets of relatively low surface field and area.

Spherical magnets as shown in FIG. 3, or other forms of magnet placed inside the tank, can be used to trap spatter before the tank is put into use, being removed with the spatter they have collected, or can be left in the tank during use, to immobilise spatter which may become dislodged during use.

Figure 5:
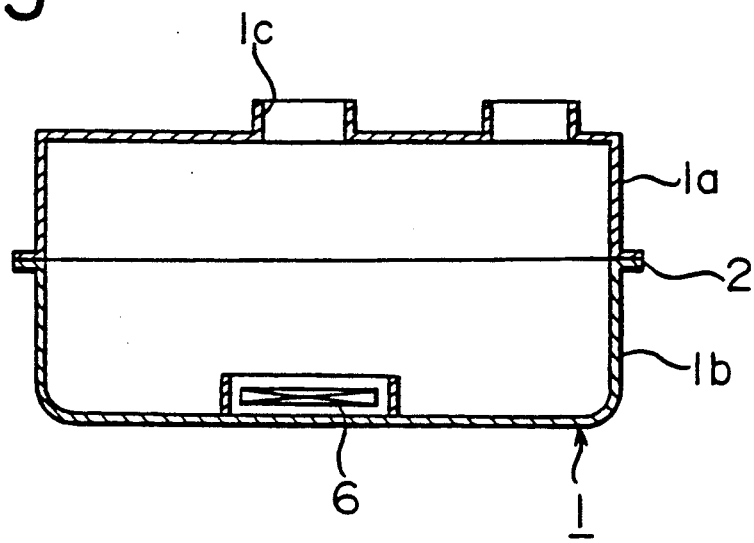
FIG. 5 is a schematic cross-sectional view of a fourth embodiment of the present invention which employs an electromagnet inside a fuel tank.

Movable magnets like the spherical magnets 5 have the advantage over stationary magnets in that by moving about the inside of the fuel tank 1 they are able to catch a greater amount of spatter than can stationary magnets. However, the magnet means can also be in the form of a stationary magnet inside the tank, and FIG. 5 illustrates a fourth embodiment of the present invention in which an electromagnet 6 comprising a coil of wire is secured to the bottom surface of the inside of the fuel tank 1 in the vicinity of the suction port of the fuel pump. This embodiment provides the same effects as the previous embodiments. Instead of an electromagnet 6, it is also possible to secure a permanent magnet to the bottom surface of the inside of the fuel tank 1.

If the magnet means is a magnet which is secured to the outside of the fuel tank 1, there is no restriction on the material constituting the magnet, but if the magnet means is a magnet which is disposed inside the fuel tank 1, as the magnet is immersed in fuel during use, it must be made of a material which is resistant to the fuel. One suitable type of permanent magnet is a plastic magnet formed by adding powder of a ferrite magnet powder or powder of a rare earth magnet to an acetal resin. A sintered body comprising these substances is also suitable. In addition to having resistance to fuels, a plastic magnet has the advantage that it can be easily formed into a desired shape. As an electromagnet which is immersed in fuel inside the fuel tank 1, a coil of magnet wire, which has good resistance to fuels, is suitable.

Figure 6:
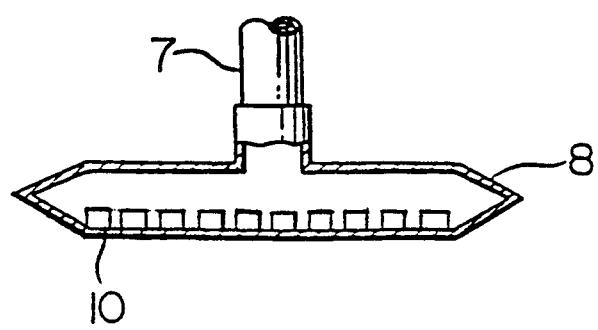
FIG. 6 is a schematic cross-sectional view of a fuel pump filter of a fifth embodiment of the present invention.

In the previously described embodiments, the magnet means is disposed in the vicinity of the suction port of the fuel pump, but it is also possible to dispose the magnet means inside the fuel filter of the fuel pump itself. FIG. 6 illustrates a hollow fuel filter 8 of the fifth embodiment of the present invention. The fuel filter 8 is in the form of a bag which is installed on the suction port 7 of a fuel pump. The bag can be made of a material such as a synthetic woven fabric which has excellent resistance to fuels. A permanent magnet 10 is disposed inside the fuel filter 8. The permanent magnets 10 are made of a material having good resistance to fuels and can be made of the same material as the spherical magnets 5 shown in FIG. 3. The magnets 10 catch spatter as it passes through the filter 8 together with the fuel and prevents the spatter from entering the suction port 7.

Figure 8:
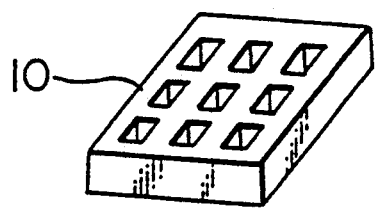
FIGS. 8 through 10 are views of various types of magnets which can be employed in the embodiments of FIG. 6 and 7.
Figure 9:
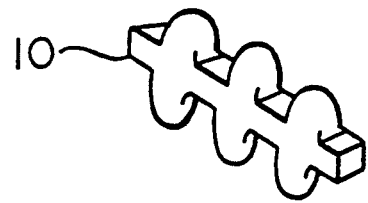
Figure 10:

There is no restriction on the shape of the magnets 10 except that they should not adversely affect the head produced by the fuel pump. Magnets 10 in the form of simple shapes such as rectangles, circles, or ellipses of constant thickness all work effectively. A permanent magnet essentially in the shape of a plate is effective, the fuel flow being forced to go past the ends of the magnet. However, the magnets 10 may also have more complex shapes having increased surface areas, such as the shapes shown in FIGS. 8 through 10. FIG. 8 illustrates a magnet 10 having holes formed therein, FIG. 9 illustrates a magnet 10 with protrusions on its surface, and FIG. 10 illustrates a magnet in the form of a net or grid of rubber or plastics magnet rods, typically 6 or 7 cm long. Many other shapes are also possible. Because of their large surface areas, such magnets can more effectively catch spatter than can magnets which are simple solids.

Figure 7:
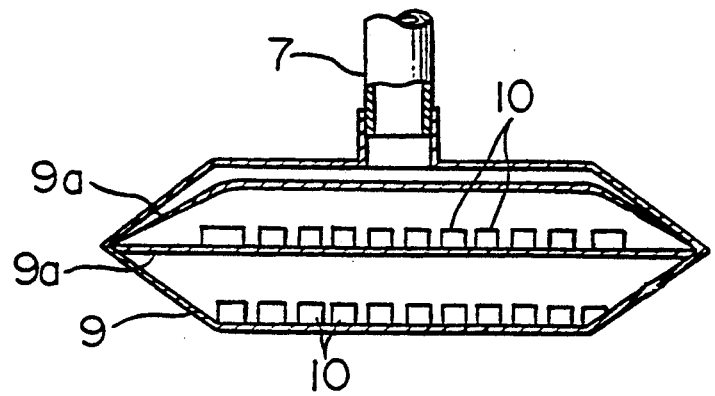
FIG. 7 is a schematic cross-sectional view of a fuel pump filter of a sixth embodiment of the present invention.

In order to prevent the magnets 10 or pieces thereof from being sucked into the suction port 7 in the event that the magnets 10 become damaged, there is preferably some member which separates the magnets 10 from the suction port 7. FIG. 7 illustrates a multi-layer fuel filter 9 in accordance with another embodiment of the present invention which has partitions 9a which surround the magnets 10 and prevent pieces of the magnets 10 from entering the suction port 7. The partitions can be made, for example, of ordinary filter material, of mesh 120 micrometers.

The structure of the embodiment of FIG. 6 and 7 is otherwise identical to that of the previous embodiments, and the same benefits are achieved. The magnets 10 inside the fuel filter 8 or 9 can be used by themselves without other magnets, or they can be used in conjunction with another magnet disposed on the bottom of the fuel tank 1 as in the previous embodiments.

Figure 11:
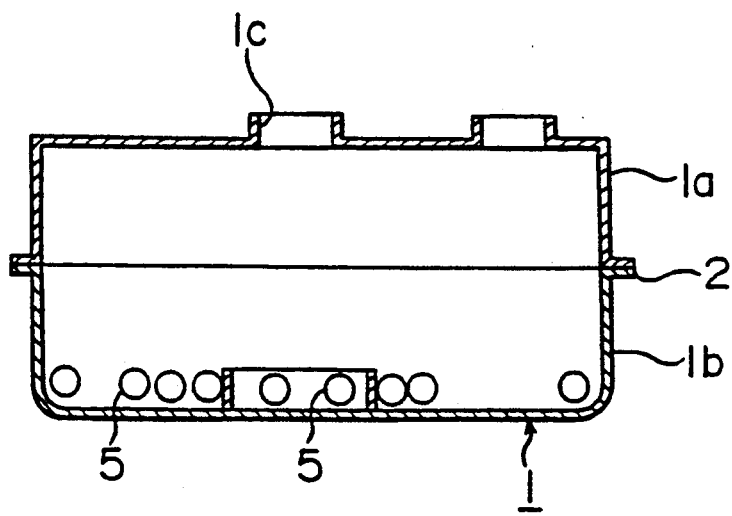
FIG. 11 is a schematic cross-sectional view of a fuel tank being cleaned in accordance with the method of the present invention.

The present invention also provides a method for cleaning a welded fuel tank during its manufacture. This method will be explained while referring to FIG. 11. This figure shows a fuel tank 1 just after it has been welded together by seam welding. After the completion of welding, a plurality of magnets 5 are inserted into the fuel tank 1 through a convenient opening, such as the fuel pump installation hole 1c. The size of the magnets 5 should be such as to enable their easy insertion and removal, and they preferably have a shape which enables them to roll about the inside of the fuel tank 1. Therefore, spherical magnets 5 like those used in the embodiment of FIG. 3 are suitable. There is no restriction on the type of magnet, and ferrite magnets, rare earth magnets, Alnico (Trade Mark) magnets, and plastic magnets can all be employed.

Figure 12:
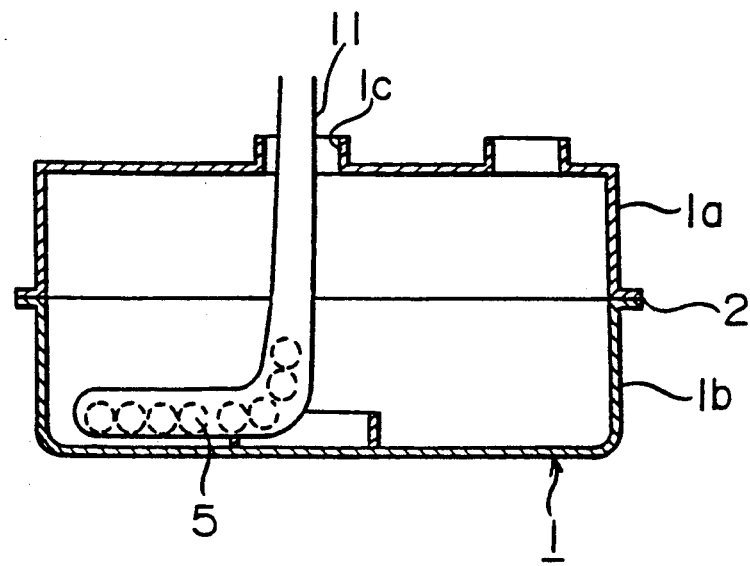
FIG. 12 is a schematic cross-sectional view of a fuel tank being cleaned in accordance with another form of the method of the present invention.

Next, the fuel tank 1 is rotated or vibrated by the application of external force. This is for the purpose of moving the magnets 5 about the inside of the fuel tank 1 and also to dislodge spatter which is caught inside gaps in the welded joint 2. As the magnets 5 roll about the fuel tank 1, they catch and hold magnetic spatter which is present within the tank 1. Other magnetic particles present in the tank 1 such as those formed during machining operations are also caught. After sufficient movement of the magnets 5, they are removed from the fuel tank 1 together with the spatter and other particles which are attached to the magnets 5. In this way, spatter can be efficiently removed from the inside of the fuel tank 1. This cleaning method is less costly than conventional cleaning methods for removing spatter from the inside of a fuel tank. However, the tank may be cleaned by conventional means, at least roughly, before insertion of the magnets. The magnets may be used in conjunction with a cleaning fluid. In order to make it easier to insert and remove the magnets 5, as shown in FIG. 12, throughout the cleaning operation, the magnets 5 can be kept inside a flexible sack 11 having dimensions small enough to enable it to easily pass through the installation hole 1c of the fuel tank 1. Various materials can be used for the sack 11, including a synthetic fiber net, nonwoven fabric, natural fabric, and a metal net.

We claim:

1. A method of cleaning a welded fuel tank having a plurality of fuel tank sections which are joined together by seam welding comprising introducing a magnet into the inside of said fuel tank after said welding has been performed; applying external force to said fuel tank so as to dislodge magnetic particles which were formed during said seam welding and which are trapped in the seam-welded portions of said fuel tank, and so as to make said magnet move around the inside of said fuel tank and contact said magnetic particles, whereby said magnet catches said magnetic particles; and removing said magnet from said fuel tank.

2. A method as claimed in claim 1 wherein said magnet has a shape which enables it to freely roll about the inside of said fuel tank when said fuel tank is tilted.

3. A method as claimed in claim 1 wherein said magnet is housed in a sack for the entire time that it is inside said fuel tank.

4. A fuel tank for a vehicle comprising:
a container having at least one seam weld and a bottom surface without openings formed therein;
a well for fuel formed in the container on the bottom surface of the container;
a fuel pump disposed in the container and having a suction port communicating with the inside of the well; and
an electromagnet disposed inside the well for collecting magnetic particles remaining in the container after formation of the seam weld, the electromagnet being intermittently energized so as to be energized when the fuel pump is operating and deenergized when the fuel pump is off.

5. A fuel tanks as claimed in claim 4 wherein the well comprises a bottom comprising the bottom surface of the container and walls which extend upwards from the bottom of the wall.

6. A fuel tank for a vehicle comprising:
a container having a seam weld and a bottom surface; and
a magnet disposed inside the container and having a surface in rolling contact with the bottom surface of the container for collecting magnetic particles in the container.

7. A fuel tank as claimed in claim 6 wherein the magnet has an irregular surface.

8. A fuel tank as claimed in claim 7 wherein the magnet has indentations formed in its surface.

9. A fuel tank as claimed in claim 6 wherein the magnet is shaped to roll about the bottom surface of the container when the container is tilted or agitated.

10. A fuel tank as claimed in claim 9 wherein the magnet is spherical.

11. A fuel tank as claimed in claim 10 wherein the magnet has dimples formed in its surface.

12. A fuel tank as claimed in claim 6 wherein the magnet is loosely disposed on the bottom of the container.

13. A method for cleaning a container for a liquid having a seam weld comprising:
placing a magnet shaped so as to roll about the bottom of the container and having a surface in rolling contact with the bottom of the container into the container after formation of the seam weld; and
exerting a force on the container prior to introducing a liquid into the container to cause the magnet to roll around the bottom of the container and collect magnetic particles.

14. A method as claimed in claim 13 further comprising removing the magnet and magnetic particles adhering thereto from the container after the step of exerting a force on the container.

15. A method of cleaning a container having a seam weld comprising:
placing a magnet shaped so as to roll on the bottom of the container and having a surface in rolling contact with the bottom of the container into the container; and
exerting a force on the container to cause the magnet to roll about the bottom of the container.

* * * * *